(12) United States Patent
Donlagic

(10) Patent No.: US 7,646,955 B2
(45) Date of Patent: Jan. 12, 2010

(54) MULTIMODE OPTICAL FIBER WITH LOW DIFFERENTIAL MODE DELAY

(75) Inventor: Denis Donlagic, Maribor (SI)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 11/658,561

(22) PCT Filed: Jul. 26, 2005

(86) PCT No.: PCT/FI2005/050284
§ 371 (c)(1),
(2), (4) Date: Nov. 10, 2008

(87) PCT Pub. No.: WO2006/010798
PCT Pub. Date: Feb. 2, 2006

(65) Prior Publication Data
US 2009/0052851 A1    Feb. 26, 2009

(30) Foreign Application Priority Data
Jul. 26, 2004 (PL) .............................. P-200400216
Jun. 27, 2005 (PL) .............................. P-200500190

(51) Int. Cl.
G02B 6/028 (2006.01)
G02B 6/036 (2006.01)

(52) U.S. Cl. ....................... 385/124; 385/126

(58) Field of Classification Search ................ None
See application file for complete search history.

(56) References Cited

U.S. PATENT DOCUMENTS

| 4,184,744 | A * | 1/1980 | Onoda et al. ................ 385/127 |
| 6,292,612 | B1 | 9/2001 | Golowich et al. |
| 6,330,382 | B1 | 12/2001 | Harshbarger et al. |
| 6,363,195 | B1 | 3/2002 | Abbott, III et al. |
| 6,434,309 | B1 | 8/2002 | Abbott, III et al. |
| 6,438,303 | B1 | 8/2002 | Abbott, III et al. |

(Continued)

FOREIGN PATENT DOCUMENTS

EP    1 043 609 A1    10/2000

(Continued)

OTHER PUBLICATIONS

International Search Report, dated Nov. 7, 2005.

(Continued)

*Primary Examiner*—Omar Rojas
(74) *Attorney, Agent, or Firm*—Venable LLP; Eric J. Franklin

(57) ABSTRACT

An optical multimode fiber including a graded index core and an extended gradient core which has a negative refractive index difference with respect to the cladding. The fiber improves the bandwidth, reliability and complexity of the telecommunication systems that are based on multimode fibers. The fiber reduces the differential mode delay among modes. The fiber thereby allows achieving large bandwidth even in the case when the highest order modes are excited. This has positive effects to the conditions that need to be fulfilled by the components such as optical sources, connectors, fiber couplers, other optical components, cables, etc. The fiber eliminates negative impact of the cladding that allows for reduction of fiber core size and the difference between the cladding and the core and thereby allows for achieving the larger bandwidth of optical fiber at lower fiber production cost.

22 Claims, 5 Drawing Sheets

U.S. PATENT DOCUMENTS

| | | |
|---|---|---|
| 6,580,543 B1 | 6/2003 | Fan et al. |
| 6,618,543 B1 | 9/2003 | Fujita et al. |
| 6,724,965 B2 | 4/2004 | Abbott, III et al. |
| 7,336,877 B2 * | 2/2008 | Bickham .................... 385/127 |

FOREIGN PATENT DOCUMENTS

| | | |
|---|---|---|
| EP | 1 083 446 A1 | 3/2001 |
| EP | 1 116 970 A1 | 7/2001 |
| EP | 1 477 831 A1 | 11/2004 |

OTHER PUBLICATIONS

Written opinion of the international searching authority, Nov. 3, 2005.

Ishigure, Takaaki, et al., "High-Bandwidth Plastic Optical Fiber With W-Refractive Index Profile," *IEEE Photonics Technology Letters*, vol. 16, No. 9, pp. 2081-2083, Sep. 2004.

Okamoto, Katsunari, et al., "Computer-Aided Synthesis of the Optimum Refractive-Index Profile for a Multimode Fiber," *IEEE Transactions on Microwave Theory and Techniques*, pp. 213-221, Mar. 1977.

Okamoto, Katsunari, et al., "Analysis of Wave Propagation in Optical Fibers Having Core with α-Power Refractive-Index Distribution and Uniform Cladding," *IEEE Transactions on Microwave Theory and Techniques*, vol. MTT-24, No. 7, pp. 416-421, Jul. 1976.

B. Stoltz, et al., "Correcting Multimode Fibers Profiles with Differential Mode Delay," *Journal of Optical Communications*, vol. 4, No. 4, pp. 139-247, 1983.

Geshiro, Masahiro, et al., "Truncated Parabolic-Index Fiber with Minimum Mode Dispersion," *IEEE Transations on Microwave Theory and Techniques*, vol. MTT-26, No. 2, pp. 115-119, Feb. 1978.

* cited by examiner

MULTIMODE OPTICAL FIBER WITH LOW DIFFERENTIAL MODE DELAY

CROSS-REFERENCE TO RELATED APPLICATIONS

This application claims priority to Slovenian patent application 200400216 filed 26 Jul. 2004 and Slovenian patent application 200500190 filed 27 Jun. 2005 and is the national phase under 35 U.S.C. § 371 of PCT/FI2005/050284 filed 26 Jul. 2005.

FIELD OF THE INVENTION

This invention relates to multimode optical fiber.

BACKGROUND OF THE INVENTION

The goal of telecommunication industry is in general the highest possible amount of data transfer in shortest possible time. With the ever increasing number of users and complexity of services there exists a daily increase in demand for the amount of data that can be transferred.

In the art there are variety of solutions that can be applied to achieve high data rate transfer over longer distances. Optical communications, that were topic of intense research and development in past 20 years, make it possible to achieve a bandwidth not comparable to other technologies. The solutions that are used today in communications over shorter distances are mainly based on multimode fibers. The advantage of multimode fiber lies mainly in the ability to couple this fiber with simple and more cost effective sources. In the past these sources were mainly LEDs with the wavelength around 850 nm. Lately, low cost laser diodes with a vertical resonator (VCSEL) have appeared in the market that enable effective coupling between optical fibers and they also achieve high modulation rates.

Conventional multimode fiber has been known for over 25 years and is standardized by international standards such as ITU-T G.651. According to the most recent recommendations such as OM3, multimode fibers can achieve bandwidths of up to 1.5 GHz.km when all modes of the fiber are excited. But even when the bandwidth of 1.5 GHz.km is achieved, differential mode delay proved to be still over 1 ns/km, which limits further increase of bandwidth. The development of low cost vertical cavity lasers (VCSEL) has lately resulted in a new concept where laser selectively excites only the lower order modes of optical fiber. This results in lower delay between fastest and the slowest excited modes, that allows for achieving the bandwidths in the excess of 1.5 Gbit.km. This approach has been the topic of intense research that lately resulted in the adoption of IEEE 802.3z and IEEE 802.3ae standards. However, the selective excitation of modes in graded index fiber also brings a range of drawbacks. Optical connectors of insufficient quality, bad splices, certain optical components cabling and process of applying the cables can induce mode coupling between the modes that can result in sudden and unexpected degradation of fiber bandwidth. The systems that base on selective excitation also require more complex field test equipment. In addition the selective excitation of modes requires better and narrower range of tolerances for the components that reduces the cost efficiency of the transmission systems. The potential main drawback of selective excitation of the modes in the future can be the lack of compatibility of such concept with the emerging technology of VCSEL arrays. The VSCEL array is composed of larger number of laser diodes with different wavelengths that are integrated on the same chip. Such configuration can allow for efficient wavelength division multiplexing. VCSEL array can be efficiently coupled to an optical fiber under the condition that the fiber core area in which the light needs to be coupled is sufficiently large. Larger VCSEL array therefore cannot be coupled with the multimode fiber while exciting only a limited number of modes.

There is an oblivious need to have a multimode fiber with large bandwidth even when an arbitrary or entire set of modes is excited.

There exists a variety of systems that enable the increase of bandwidth of multimode fibers. As already described, most of those systems are based on selective excitation of modes in multimode fibers. There are also individual non-standard solutions that are based on selective excitation of the modes as described for example in U.S. Pat. No. 6,580,543 and U.S. Pat. No. 6,330,382. There are solutions that enable archiving the bandwidths over 1.5 GHz.km in an restricted launch but at the same time enable bandwidths over 500 MHz.km while exciting the entire set of modes. Such solutions are presented in U.S. Pat. No. 6,434,309, U.S. Pat. No. 6,438,303, U.S. Pat. No. 6,618,543 and U.S. Pat. No. 6,724,965. Dispersion compensation according to U.S. Pat. No. 6,363,195 has also been proposed but its efficiency is limited.

Significant efforts have been also made to develop fiber index profiles that yield high bandwidth to equalize the delay times of high order modes in a multi-mode fiber and to compensate for the center dip. Those efforts were mainly done in the early era of optical fibers. For example in Geshiro et al., "Truncated Parabolic-Index Fiber with Minimum Mode Dispersion," IEEE TRANS. MICROWAVE THEORY AND TECHNIQUES, Vol. MTT-26, No. 2 (February 1978), at p. 115, a parabolic index profile is combined with a cladding jump, which leads to higher bandwidths than with a parabolic profile with no cladding jump. U.S. Pat. No. 6,292,612, discloses MM fiber having a refractive index profile that differs from a conventional α-type profile by at least one of the following: i) a step formed in the index profile at the core/cladding boundary, in conjunction with a linear correction; (ii) a ripple near the core/cladding boundary, in combination with a linear correction, with or without an index step; and iii) an annular ridge formed in the index profile with a center dip. In Stolz and Yevick "Correcting Multimode Fiber Profiles with Differential Mode Delay", J. Optical Communications, vol 4 (1983), no 4 pp. 139-147 trimming of the MMF core edge to reduce the highest order modes differential delay has been proposed.

The idea of reducing the higher order mode delay by extension of graded index core beneath the cladding level was first proposed in K. Okamoto and T. Okoshi, "Analysis of Wave Propagation in Optical Fibers Having Core with a α-Power Refractive-Index Distribution and Uniform Cladding" IEEE Transactions on Microwave Theory and Techniques, 24(7), pp. 416-421, March 1976. In this work the α-profile multimode fiber profile was extended below the cladding level (e.g., outside the core/cladding boundary region), with a negative cladding jump. The supporting analysis demonstrated that the absolute value of negative extension of the α-core beneath the cladding level needs to be approximately of the same depth as the absolute difference between the maximum refractive index of the core at its center and the cladding level. In case of common silica telecommunication multimode fiber with index $\Delta=1\%$, such negative refractive index core extension beneath the cladding would need to be approximately $-1\%$. This is a condition that is not technically and economically compatible with current manufacturing techniques for silica-based fibers. However, in plastic optical fiber where negative index differences of the profile with the respect to the cladding are easy to achieve, this approach has been already successfully applied, see T. Ishigure, H., K. Ohdoko, and Y. Koike, "High-Bandwidth Plastic Optical Fiber With W-Refractive Index Profile", IEEE Photonics Technology Letters, 16 (9), pp. 2081-2083, September 2004. Further efforts were conducted to develop this concept in Katsunari Okamoto and Takanori Okoshi in "Computer-Aided Synthesis of the Optimum Refractive-Index Profile for a Multimode Fiber" IEEE Transactions on Microwave Theory and Techniques, 25(3), pp. 213-221, March 1977. A trial and error algorithm was used to automatically search for an optimum fiber profile shape that includes the extension of the core beneath the cladding level. The result of numerical optimisation was an optimal profile, which is reported to be a smoothed W-shaped profile (e.g., FIG. 1 thereof. This synthesized profile was similar to α-profile fiber in the region with positive relative refractive index difference, however in the region near the edges of the core where the index difference was below the cladding level, the smoothed shape deviating from α-alpha profile was characteristic. The maximum absolute value of the relative index difference of the core extension and the cladding level was still in the best case one half of the absolute difference between the maximum refractive index of the core at its center and the cladding level. In case of standard 50 μm fiber the index maximum relative negative index difference of the profile would need to be below −0.5% while the region would require precise shaping in accordance with the results of numerical optimization process. While such profiles may be advantageous in leading to high bandwidths, they are barely incompatible with the manufacturing process for silica-based fiber. It is know from the literature that achieving negative index difference in silica fiber manufacturing process close or below −0.5% is very difficult and uneconomical, especially if precise control of the profile is required. In addition, it is believed that such profiles may lead to leaky modes as the regions with the negative index difference are deep and wide and provide good isolation of leaky modes from the cladding.

SUMMARY OF THE INVENTION

This invention relates to multimode optical fiber that can achieve a bandwidth in excess of 5 GHz.km while exciting an arbitrary set of modes. Such fiber is intended for high speed data communications over shorter distances, but other applications are also possible.

The technical problem solved by the invention is the reduction of differential mode delay that limits the bandwidth of the telecommunication system. The invention presents profile designs of multimode optical fibers, which can achieve a bandwidth of over 5 GHz.km regardless of the excited excited set of modes, including the cases when in a multimode fiber the highest order modes are excited or the entire set of modes is excited.

In the present invention the problem is solved by introduction of special structure in the profile of multimode optical fiber that enables the equalization of the group velocities of higher and lower order modes and is at the same time compatible with current manufacturing processes.

The present invention uses core extension beneath the cladding level to minimize the differential mode delay among the modes. However, the negative index differences are appropriately small to enable practical and economical fiber manufacturing. This is achieved by introduction of depression with negative index of refection relative to the cladding around the extended core. In addition, the entire core of the fiber resembles α or nearly α-profile including the section that extends beneath the cladding level that further simplifies fiber manufacturing and differentiates this invention from current state of the art.

BRIEF DESCRIPTION OF THE DRAWINGS

The invention will be described using examples and figures.

DETAILED DESCRIPTION OF EMBODIMENTS OF THE INVENTION

Detailed numerical analysis has shown that it is not possible to achieve a bandwidth significantly over 1.5 GHz.km when the entire set of modes is excited in a standard multimode fiber. It is generally known that the modal dispersion is minimized by application of the α-profile of the optical fiber that is defined as $$n(r) = n_{max}(1 - 2\Delta(r/a)^\alpha)^{1/2} \text{ for } r < a$$

and $$n_{max}(1 - 2\Delta)^{1/2} \text{ for } r \geq a$$

where r is a coordinate in the radial direction of a cylindrical optical fiber, a is core radius, n(r) is refractive index of the optical fiber at radius r, $n_{min}$ is the minimum refractive index (in standard fiber this is the refractive index of the cladding), $n_{max}$ is the maximum refractive index of the fiber core, α is a parameter of the profile, and Δ is defined as $$\Delta = (n_{max}^2 - n_{min}^2)/(2n_{max}^2).$$

The profile of standard multimode fibers is composed of a graded index core that is defined by upper equation that describes α-profile of the optical fiber and cladding with the constant refractive index $n_{min}$. The α-parameter of the profile is around the value of 2, depending on the wavelength for which the fiber is optimized.

Figure 1:
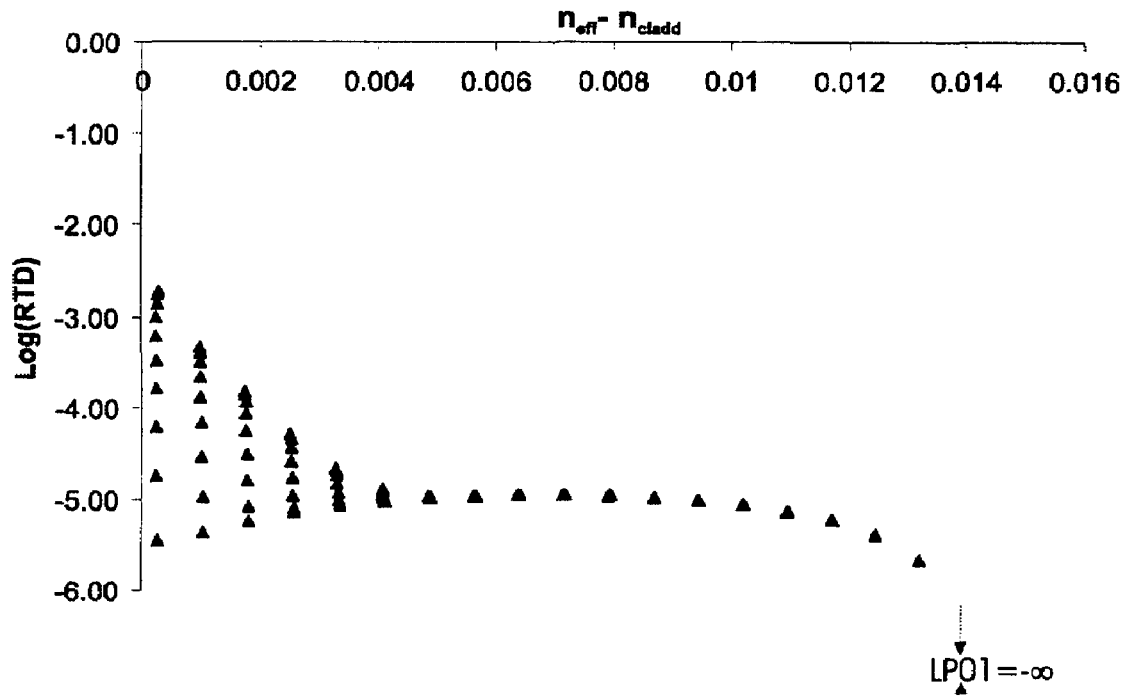
FIG. 1 shows the logarithm of relative time delay (RTD) in standard 50 μm optical fiber at the wavelength of 850 nm. Each dot in the figure presents one linearly polarized mode. Many dots are overlapping.
Figure 2:
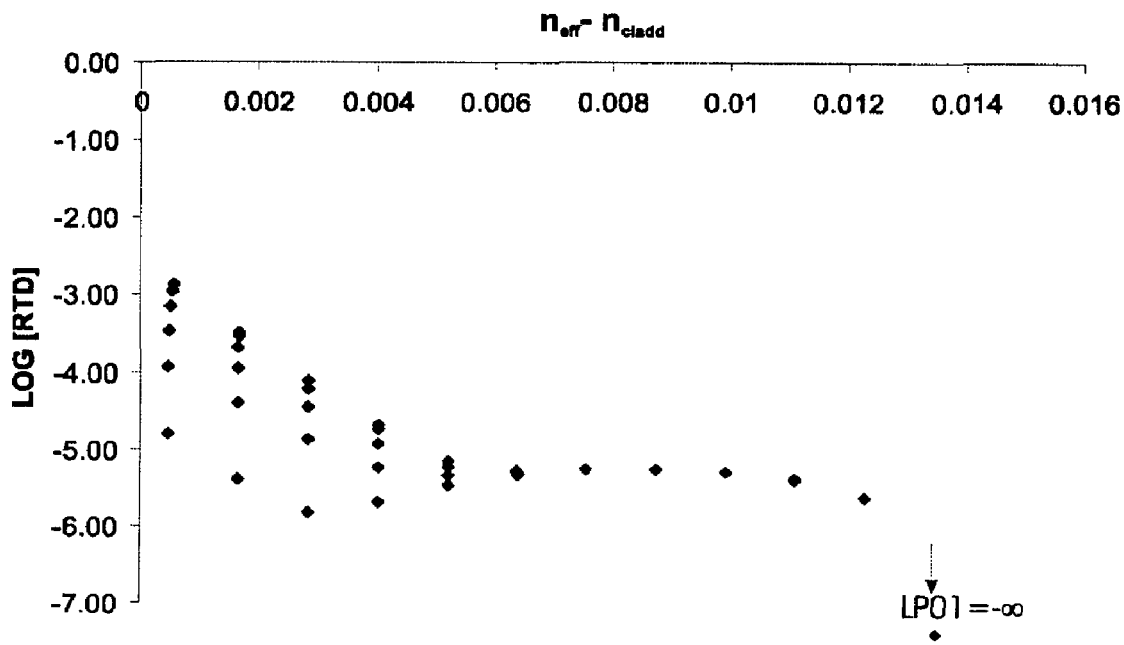
FIG. 2 shows the logarithm of relative time delay (RTD) in standard 50 μm optical fiber at the wavelength of 1310 nm. Each dot in the figure presents one linearly polarized mode. Many dots are overlapping.

The detailed numerical analysis showed that the conventional α-profile does not allow for minimization of highest order mode group delays when compared to the lower order modes, as shown in FIGS. 1 and 2. FIGS. 1 and 2 represent the logarithm of relative time delay (RTD) as a function of difference between the effective indices of the modes and cladding level. The RTD is defined as:

$$RTD = \frac{|\text{group delay of the fundamental mode} - \text{group delay of the observed higher order mode}|}{\text{group delay of the observed higher order mode}}$$

FIGS. 1 and 2 show that the delays of the highest order modes are significantly larger when compared to delays of the lower order modes, which results in pronounced modal dispersion and thereby limits the bandwidth of the optical fiber when higher order modes are excited. Large delays are the consequence of negative impact of the cladding with the constant refractive index of refraction on the propagation of the higher order modes. In fact, a significant portion of the evanescent field of the highest order modes propagates in the cladding where effect of the group velocity equalization, provided by the graded index core is not present.

Figure 3:
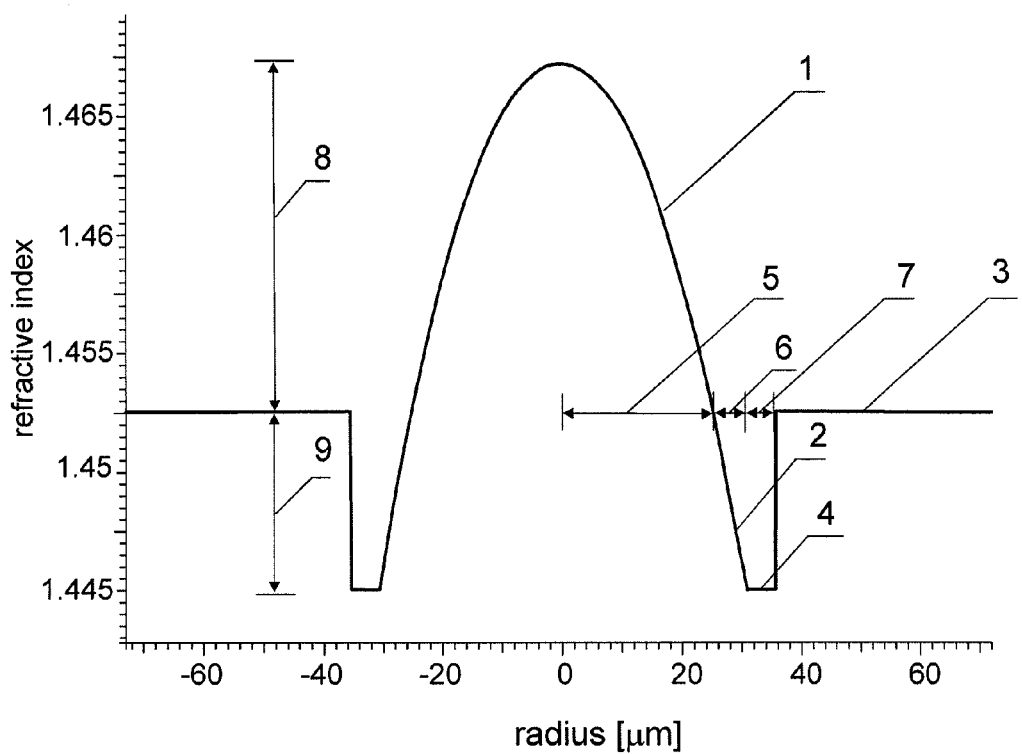
FIG. 3 shows an example of an improved profile with the definition of depressed extended core and depression.

The presented invention solves the problem of negative impact of the cladding in accordance with FIG. 3 in a way to introduce into the known multimode fiber profile that is composed of core 1 with radius a 5 and reflection index difference $\Delta_1$ 8 and cladding 3, additional profile structures:
 a) depressed extended core 2 with radial dimension b 6 and relative refractive index difference $\Delta_2$ 9 with respect to the cladding 3 that is a continuation of the primary core 1 with α-profile.
 b) depression 4 with radial dimension c 7 and relative refractive index difference $\Delta_2$ 9 with the respect to the cladding 3, which encircles the extended core.

Figure 4:
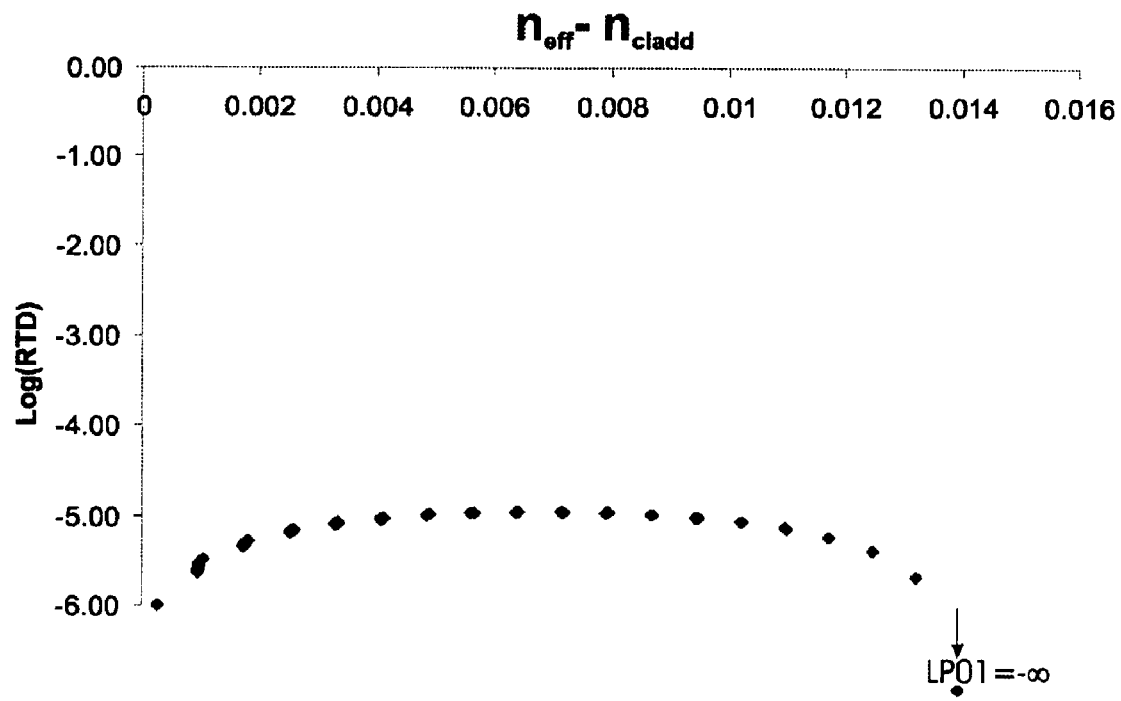
FIG. 4 shows logarithm of relative time delay (RTD) in improved 50 μm optical fiber at the wavelength of 850 nm. Each dot in the figure presents one linearly polarized mode. Many dots are overlapping.
Figure 5:
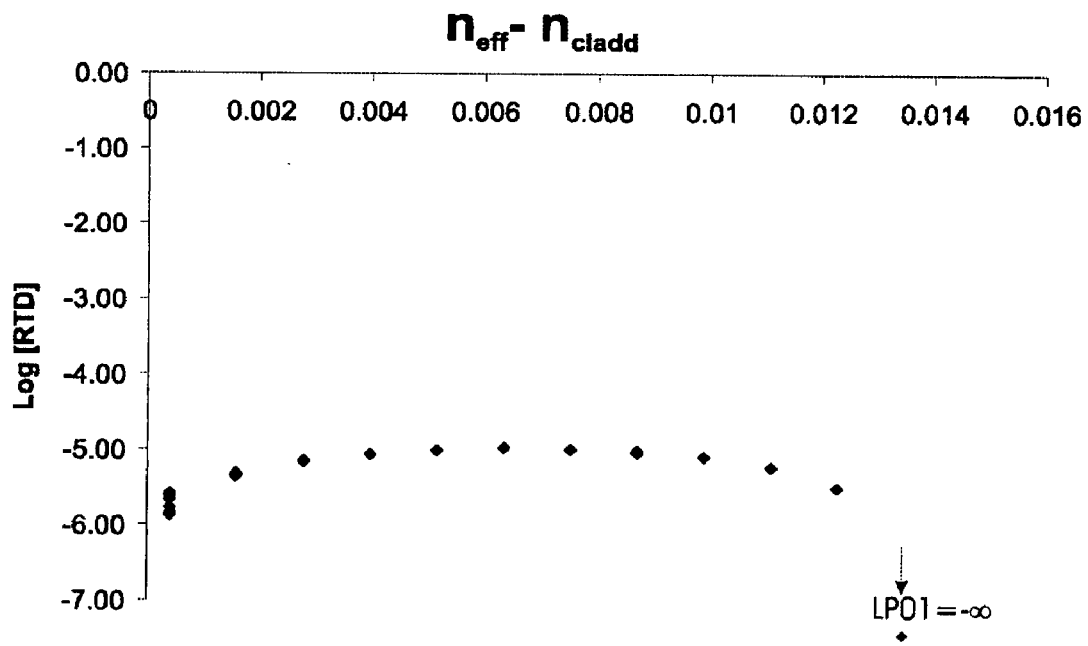
FIG. 5 shows the logarithm of relative time delay (RTD) in improved 50 μm optical fiber at the wavelength of 1310 nm. Each dot in the figure presents one linearly polarized mode. Many dots are overlapping.

The introduced profile structures have two effects: the major fractions of the evanescent highest order modal fields propagate in the extended depressed core 2, that has α-profile shape and thereby enables good equalization of group velocities of highest order modes, and assures better confinement of the highest order modal fields to the main core 1 and extended core 2. The final effect is such that the fraction of the evanescent field of the highest order modes that propagate in the cladding with the constant index of refraction 3 becomes negligible. This enables very good equalization of group velocities of higher order modes as shown in FIGS. 4 and 5. Both figures clearly show significant reduction (improvement) of relative delay between modes when compared to FIGS. 1 and 2. The set of parameters for depressed extended core 2 and index depression 4, that allows for equalization of group velocities is broad and wavelength depended. For the practical manufacturability of the fibers, the minimal dimensions of both profile features are important. Larger extended core 2 requires smaller dimensions of the depression 4 and vice versa. In an extreme case the depression 4 can be omitted, but in such a case the size and depth of the extended core 2 increases to the level impractical for fiber manufacturability.

Figure 6:
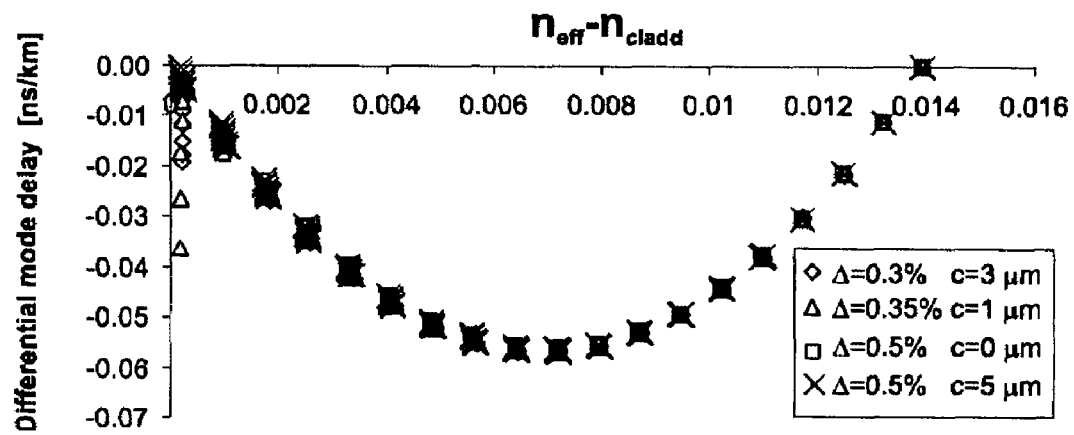
FIG. 6 shows absolute delay in improved 50 μm optical fiber at 850 nm for different profile parameters. Each dot in the figure presents one linearly polarized mode. Many dots are overlapping.
Figure 7:
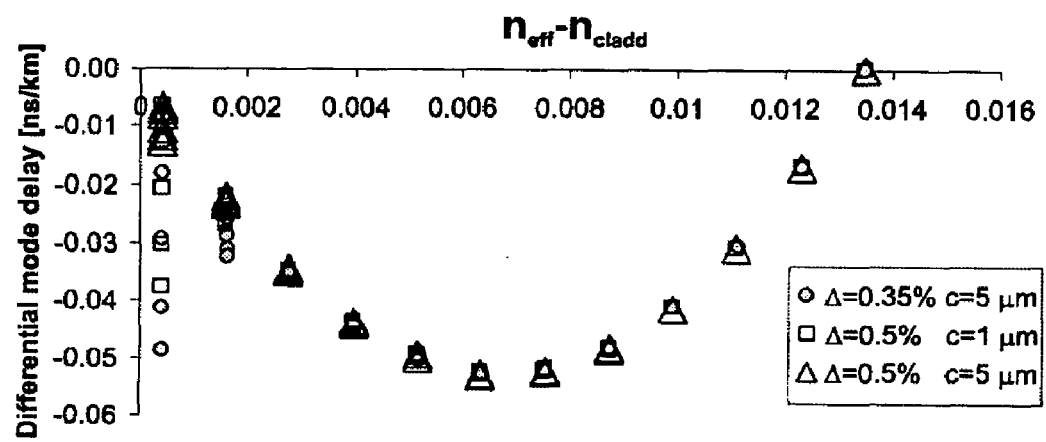
FIG. 7 shows absolute delay in improved 50 μm optical fiber at 1310 nm for different profile parameters. Each dot in the figure presents one linearly polarized mode. Many dots are overlapping.

FIGS. 6 and 7 present absolute delays between individual modal groups for the case of fiber with following parameters: 2a=50 µm, $\Delta_1$=1%, $\Delta_2$=−0.5%, b=5.5, c=5 µm and α=2.087 at 850 nm and α=2.0 at 1310 nm. FIGS. 6 and 7 clearly show that the largest modal delays between the modes do not exceed 0.057 ns/km at 850 nm and 0.053 ns/km at 1310 nm. Achieving the bandwidths in excess of 10 GHz.km is therefore possible even when all modes of the fiber are excited.

A systematic numerical investigation was carried out to determine practical and minimal radial dimensions of b (in FIG. 3 marked by 6) of the extended core, radial dimensions c (in FIG. 3 marked by 9) that enable effective elimination of the cladding influence and thereby minimization of modal dispersion. Table 1 demonstrates practically determined fiber profile parameters that limit the modal dispersion caused by cladding influence below the theoretical value that is achievable with an ideal α-profile fiber with the core size of 2a=50 µm and $\Delta_1$=1%.

TABLE 1

|  | 850 nm | 1310 nm |
| --- | --- | --- |
| $\Delta_2$ = −0.3% | b = 4.4 µm, c = 3 µm | — |
| $\Delta_2$ = −0.35% | b = 4.9 µm, c = 1 µm | b = 4 µm, c = 5 µm |
| $\Delta_2$ = −0.5% | b = 5.35 µm, c = 0 µm | b = 5.5 µm, c = 1 µm |

The successful control over the cladding influences enables further reduction of fiber core size a and $\Delta_1$ below the values that are typical for standard fibers. In case where only the core size a and $\Delta_1$ would be reduced, without eliminating the cladding influence, the fiber would not have significantly better bandwidth than is currently available by standard fibers. The introduction of extended depressed core 2 and depression 4 therefore allows for reduction of the radius a of the core 1 and the refractive index difference $\Delta_1$ that is reflected in an bandwidth increase and lowering of fiber production cost. The reduction of $\Delta_1$ namely reduces the contents of germanium, that is the most expensive material in multimode fiber production. In order to maintain sufficient resistance of such fiber to bend losses, the reduced core fiber needs to have appropriate profile parameters that enable sufficient separation of the modal groups in the phase constant space. The differences between effective indexes of refraction for neighboring modal groups shall be as large as in standard multimode fibers. In practice this means that the difference between effective indexes between modal groups shall be around 0.001 at the wavelength of 1310 nm and 0.0007 at the wavelength of 850 nm. The practical examples of profile parameters for such fibers with the radius of a=19 µm and a=15 µm are shown in table 2.

TABLE 2

| | 850 nm | | | | 1310 nm | | | |
| --- | --- | --- | --- | --- | --- | --- | --- | --- |
| Core | α | $\Delta_2$ [%] | b [µm] | c [µm] | α | $\Delta_2$ [%] | b [µm] | c [µm] |
| a = 15 µm, $\Delta_1$ = 0.36% | 2.1027 | −0.25 | 4.24 | 3 | 2.015 | −0.4 | 6.7 | 5 |
| a = 19 µm, $\Delta_1$ = 0.578% | 2.0965 | −0.35 | 4.81 | 3 | 2.01 | −0.45 | 6.27 | 5 |

In spite of the reduced core size, the presented fibers can be effectively coupled to existing VCSEL.

Figure 8:
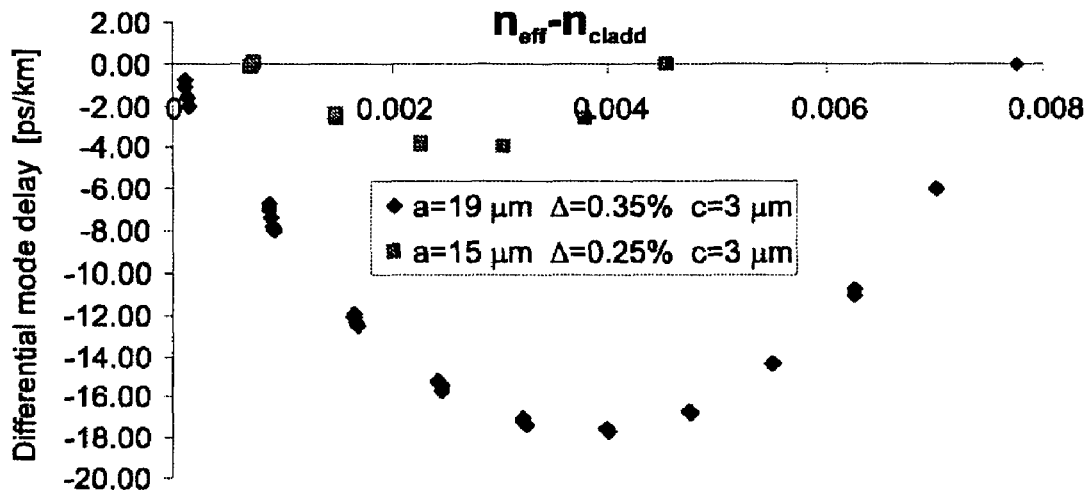
FIG. 8 shows absolute delay in reduced core optical fibers at 850 nm for different profile parameters. Each dot in the figure presents one linearly polarized mode. Many dots are overlapping.
Figure 9:
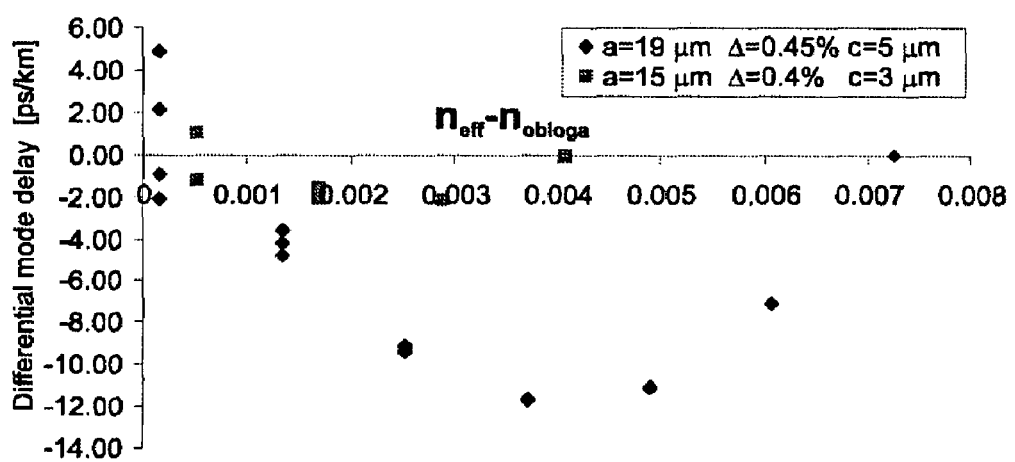
FIG. 9 shows absolute delay in reduced core optical fibers at 1310 nm for different profile parameters. Each dot in figure presents one linearly polarized mode. Many dots are overlapping.

The core radius reduction a and $\Delta_1$ is reflected in significant increase of bandwidth as shown in FIGS. 8 and 9. The maximum delay between the slowest and the fastest mode is for the 19 µm fiber less than 18 ps/km and less than 5 ps/km for the fiber with a=15 μm. This makes it possible to achieve a theoretical bandwidth of 50 to 100 GHz.km.

To an expert in art of optical fibers it is clear that the values of parameters presented in the tables 1 and 2 present only typical examples and variations of these parameters can be found that will provide similar or equal performances that where shown in presented practical examples.

According to a first further aspect of the invention, there is provided an optical telecommunication system including an optical transmitter, a receiver, and a multimode optical fiber. The multimode fiber has a refractive index profile with a graded index core 1, with a depressed extended gradient core 2, with a depression, and with a cladding extending to the outer edge of the fiber. The core 1 has a radius a that is larger than 22 μm and less than 27 μm. The core 1 has a refractive index difference $\Delta_1$ that is larger than 0.7% and less than 1.5%. The depressed extended gradient core 2 has a radial dimension b and a negative refractive index difference $\Delta_2$, that is between −0.1% and −0.5%. The depression has the refractive index difference $\Delta_2$.

The system of the first further aspect may be such that the bandwidth of the system is greater than 5 Gbit.km and a complete set of guided modes is excited in the fiber.

According to a second further aspect of the invention, there is provided an optical telecommunication system including an optical transmitter, a receiver, and a multimode optical fiber. The multimode fiber has a refractive index profile with a graded index core 1, with a depressed extended gradient core 2, with a depression 3, and with a cladding 4 extending to the outer edge of the fiber. The graded index core 1 has a radius a that is larger than 22 μm and less than 27 μm. The graded index core 1 has a refractive index difference $\Delta_1$, that is larger than 0.7% and less than 1.5%. The depressed extended gradient core 2 has a radial dimension b and a negative refractive index difference $\Delta_2$ that is between −0.1% and −0.5%. The depression has the refractive index difference $\Delta_2$.

The system of the second further aspect may be such that the bandwidth of the system is greater than 10 Gbit.km and a complete set of guided modes is excited in the fiber.

According to a third further aspect of the invention, there is provided a multimode optical fiber that supports propagation of more than 7 linearly polarized modes and poses a maximum differential mode delay among guided modes that is less than 0.5 ns/km. The fiber includes a graded index core 1, a depressed extended gradient core 2, a depression, and a cladding extending to the outer edge of the fiber. The graded index core 1 has a radius a that is larger than 22 μm and less than 27 μm. The graded index core 1 has a refractive index difference $\Delta_1$, that is larger than 0.7% and less than 1.5%. The depressed extended gradient core 2 has a radial dimension b and a negative refractive index difference $\Delta_2$ that is between −0.1% and −0.5%. The depression has the refractive index difference $\Delta_2$.

The fiber of the third further aspect may be such that the difference between effective indexes of the neighboring modal groups in the multimode optical fiber is at least 0.001 at wavelength of 1310 nm and at least 0.0007 at wavelength of 850 nm.

According to a fourth further aspect of the invention, there is provided a multimode optical fiber that supports propagation of more than 5 linearly polarized modes and poses the maximum differential mode delay among guided modes that is less than 0.25 ns/km. The fiber includes a graded index core 1, a depressed extended gradient core 2, a depression, and a cladding extending to the outer edge of the fiber. The graded index core 1 has radius a that is larger than 22 μm and less than 27 μm. The graded index core 1 has a refractive index difference $\Delta_1$ that is larger than 0.7% and less than 1.5%. The depressed extended gradient core 2 has a radial dimension b and a negative refractive index difference $\Delta_2$ that is between −0.1% and −0.5%. The depression has the refractive index difference $\Delta_2$.

The fiber of the fourth further aspect may be such that the difference between effective indexes of the neighboring modal groups in the multimode optical fiber is at least 0.001 at wavelength of 1310 nm and at least 0.0007 at wavelength of 850 nm.

According to a fifth further aspect of the invention, there is provided a multimode optical fiber including a graded index core 1, an extended depressed gradient core 2, a depression, and a cladding. The graded index core 1 has an α profile shape and a radius α. The extended depressed gradient core 2 has an α profile shape that is a continuation of the gradient index core 1. The radial dimension of the depressed extended core is greater than 0.4 μm and less than 15 μm. The relative difference $\Delta_2$ of refractive indexes between the outer edge of extended depressed core and the cladding 3 is between −0.1% and −0.4%. The depression surrounds the extended gradient core 2 and has a radial dimension larger than 15 μm.

According to a sixth further aspect of the invention, there is provided a multimode optical fiber including a graded index core 1, a depressed extended gradient core 2, a depression, and a cladding. The graded index core 1 has an α profile shape and a radius a that is larger than 15 μm and less than 26 μm. The relative refractive index difference $\Delta_1$ between the core center and the cladding 3 is between 0.3% and 1%. The depressed extended gradient core 2 has a profile shape which is a continuation of the graded index core 1. The extended gradient core has a radial dimension b which is greater than 1 μm and less than 7 μm. The depression surrounds the extended gradient core and has a radial dimension between 2 μm and 35 μm. The relative index difference $\Delta_2$ between the outer depression and the cladding is between −0.1% and −0.5%. The cladding surrounds the depression.

According to a seventh further aspect of the invention, there is provided an optical telecommunication system including an optical transmitter, a receiver and a multimode optical fiber. The multimode fiber has a refractive index profile with a graded index core 1, with a depressed extended gradient core 2, with a depression, and with a cladding extending to the outer edge of the fiber. The graded index core 1 has a radius α that is larger than 5 μm and less than 55 μm. The graded index core 1 has a refractive index difference $\Delta_1$ that is larger than 0.35% and less than 2.1%. The depressed extended gradient core 2 has a radial dimension b and a negative refractive index difference $\Delta_2$. The depression has a radial dimension c and the refractive index difference $\Delta_2$.

The system of the seventh further aspect may be such that the bandwidth of the system is greater than 1.5 Gbit.km and a complete set of guided modes is excited in the multimode fiber.

The system of the seventh further aspect may be such that the depressed extended core 2 has a radial dimension 6 which is between 0.5 μm and 5 μm, the negative refractive index difference $\Delta_2$ has an absolute value between 0.15% and 0.7%, and the depression has a radial dimension c which is between 0 and 10 μm.

The system of the seventh further aspect may be such that the radial dimension b of the depressed extended gradient core 2 is greater than 1 μm and less than 10 μm.

The system of the seventh further aspect may be such that the absolute value of the refractive index difference $\Delta_2$ is greater than 0.15% and less than 1.5%.

The system of the seventh further aspect may be such that the radial dimension of the depression c is between 0 and 35 µm.

The system of the seventh further aspect may be such that the difference between effective indexes of the neighboring modal groups is at least 0.001 at wavelength of 1310 nm and at least 0.0007 at wavelength of 850 nm.

The system of the seventh further aspect may be such that the radial dimension 6 of the depressed extended core 2 is between 0.5 µm and 5 µm, the negative difference of refractive index $\Delta_2$ has an absolute value between 0.15% and 0.7%, and the radial dimension c of the depression is between 0 and 7 µm.

According to an eighth further aspect of the invention, there is provided a multimode optical fiber that supports propagation of more than 7 linearly polarized modes and which includes a graded index core 1, a depressed extended core 2, a depression 3, and a cladding 4 up to the outer edge of the fiber. The depressed extended core 2 has a negative index difference $\Delta_2$ and a radial dimension b that is larger than 2 µm. The depression 3 has a radial dimension c.

The fiber of the eighth further aspect may be such that the graded index core 1 has a radius a that is greater than 7 µm and less than 70 µm and a refractive index difference $\Delta_1$ whose absolute value is greater than 0.35% and less than 2.1%.

The fiber of the eighth further aspect may be such that the radial dimension b of the depression extended core 2 is between 0 and 7 µm.

The fiber of the eighth further aspect may be such that the absolute value of the refractive index difference $\Delta_2$ is greater than 0.2% and less than 2%.

The fiber of the eighth further aspect may be such that the radial dimension of the depression c of the fiber is between 0 and 35 µm.

The fiber of the eighth further aspect may be such that the difference between effective indexes of the neighboring modal groups in the fiber is at least 0.001 at wavelength of 1310 nm and at least 0.0007 at wavelength of 850 nm.

The fiber of the eighth further aspect may be such that the radial dimension b of the depressed extended core 2 is between 0 µm and 5 µm, the absolute value of the refractive index difference $\Delta_2$ is between 0.17% and 0.5%, and the radial dimension c of the depression is between 0 µm and 10 µm.

According to a ninth further aspect of the invention, there is provided an optical telecommunication system including an optical transmitter, a receiver, and a multimode optical fiber. The multimode fiber has a refractive index profile with a graded index core 1, with a depressed extended gradient core 2, and with a cladding 4 extending to the outer edge of the fiber. The graded index core 1 has a radius a that is larger than 5 µm and less than 55 µm. The graded index core 1 has a refractive index difference $\Delta_1$ that is larger than 0.35% and less than 2.1%. The depressed extended gradient core 2 has a radial dimension b between 2 µm and 10 µm.

According to a tenth further aspect of the invention, there is provided an optical telecommunication system including an optical transmitter, a receiver, and a multimode optical fiber. The multimode fiber has a refractive index profile with a graded index core 1, a depressed extended gradient core 2, and a cladding 4 extending to the outer edge of the fiber. The graded index core 1 has a radius α that is larger than 5 µm and less than 55 µm. The graded index core 1 has a refractive index difference $\Delta_1$ that is larger than 0.35% and less than 2.1%. The depressed extended gradient core 2 has a radial dimension b between 1 µm and 10 µm.

The system of the tenth further aspect may be such that the cladding is composed of two or more layers of material with different refractive indexes with radial dimensions between 0 and 100 µm, a refractive index difference with resects to the outermost layer having an absolute value between 0 and 2%.

According to an eleventh further aspect of the invention, there is provided an optical telecommunications system including an optical transmitter, a receiver, and a multimode optical fiber, such that the bandwidth of the system is greater than 1.5 Gb.km, and an arbitrary set of guided modes is adapted to be excited in the multimode fiber. The multimode fiber has a refractive index profile with graded index core 1, a depressed extended gradient core 2, a depression, and a cladding extending to the outer edge of the fiber. The graded index core 1 has a radius a that is larger than 5 µm and less than 55 µm. The graded index core 1 has and a refractive index difference $\Delta_1$ that is larger than 0.35% and less than 2.1%. The depressed extended gradient core 2 has a radial dimension b and a negative refractive index difference $\Delta_2$.

The system of the eleventh further aspect may be such that the radial dimension b of the depressed extended gradient core 2 is greater than 1 µm and less than 10 µm.

The system of the eleventh further aspect may be such that the absolute value of the refractive index difference $\Delta_2$ is greater than 0.15% and less than 1.5%.

The system of the eleventh further aspect may be such that the radial dimension of the depression c is between 0 and 35 µm.

The system of the eleventh further aspect may be such that the difference between effective indexes for the neighboring modal groups is at least 0.001 at wavelength of 1310 nm and at least 0.0007 at wavelength of 850 nm.

According to a twelfth further aspect of the invention, there is provided a multimode optical fiber including a graded index core 1, a depressed extended gradient core 2, a depression that surrounds the extended gradient core, and a cladding that surrounds the depression. The graded index core 1 has a radius α that is larger than 10 µm and less than 35 µm. The depressed extended gradient core 2 has an α profile shape which is a continuation of the gradient index core 1. The radial dimension of depressed extended core is greater than 0.5 µm and less than 7 µm. The depression has a radial dimension between 0 and 20 µm. The cladding has a radial dimension that is greater than 15 µm.

According to a thirteenth further aspect of the invention, there is provided a multimode optical fiber including a graded index core 1, a depressed extended gradient core 2, and a multilayer or graded cladding 3. The graded index core 1 has an α profile shape with radius α that is greater than 10 µm and less than 35 µm. The depressed extended gradient core 2 has an α profile shape which is a continuation of the gradient index core 1. The radial dimension of the depressed extended core is greater than 0.5 µm and less than 7 µm. The cladding 3 surrounds the gradient core and has a radial dimension that is greater than 15 µm.

According to a fourteenth further aspect of the invention, there is provided a multimode optical fiber including a graded index core 1, an extended depressed gradient core 2, a depression that surrounds the extended gradient core, and a cladding that surrounds the depression. The graded index core 1 has an α profile shape with radius α that is larger than 7 µm and less than 35 µm. The graded index core 1 has a relative difference $\Delta_1$ of refractive indexes between the core center and the cladding which is between 0.3% and 2%. The extended depressed gradient core 2 has an α profile shape which is a continuation of the gradient index core 1. The radial dimension of the depressed extended core is greater than 0.2 µm and less than 15 μm. The relative difference $\Delta_2$ of refractive indexes between the outer edge of the extended depressed core and the cladding is between −0.1% and −0.7%. The depression has a radial dimension between 0 and 35 μm. The negative refractive index difference $\Delta_2$ between the depression and the cladding is between −0.1% and −0.7%. The cladding 3 that surrounds the extended depression gradient core 2 has a radial dimension that is greater than 15 μm.

According to a fifteenth further aspect of the invention, there is provided a multimode optical fiber including a graded index core 1, an extended depressed gradient core 2, a depression, and a cladding. The graded index core 1 has an α profile shape with a radius α that is larger than 7 μm and less than 35 μm. The relative difference $\Delta_1$ of refractive indexes between the core center and the cladding is between 0.3% and 2%. The extended depressed gradient core 2 has an α profile shape that is a continuation of the gradient index core 1. The radial dimension of the depressed extended core is greater than 0.2 μm and less than 15 μm. The relative difference $\Delta_2$ of refractive indexes between the outer edge of extended depressed core and the cladding is between −0.1% and −0.7%. The cladding 3 that surrounds the extended depression grading core 2 has a radial dimension that is greater than 15 μm.

According to a sixteenth further aspect of the invention, there is provided a multimode optical fiber including a graded index core 1, a depressed extended core, a depression that surrounds the extended depression gradient core, and a cladding. The graded index core 1 has an α profile shape, and the extended depressed gradient core 2 has an α profile shape that is a continuation of the gradient index core 1. The radial dimension of the depressed extended core is greater than 0.2 μm and less than 15 μm. The relative difference $\Delta_2$ of refractive indexes between the outer edge of the extended depressed core and the cladding is between −0.1% and −0.7%. The cladding 3 that surrounds the extended depression grading core 2 has a radial dimension that is greater than 15 μm.

According to a seventeenth further aspect of the invention, there is provided a multimode optical fiber including a graded index core 1, an extended depressed gradient core 2, a depression, and a cladding. The graded index core 1 has an α profile shape, and the extended depressed gradient core 2 has an α profile shape and is a continuation of the gradient index core 1. The radial dimension of the depressed extended core is greater than 0.4 μm and less than 15 μm. The relative negative difference $\Delta_2$ of refractive indexes between the outer edge of extended depressed core and the cladding is between −0.15% and −0.7%. The cladding 3 that surrounds the extended depression grading core 2 has a radial dimension that is greater than 15 μm.

According to an eighteenth further aspect of the invention, there is provided a multimode optical fiber including a graded index core 1, an extended depressed gradient core 2, a depression, and a cladding 3 that surrounds the depression 4. The graded index core 1 has an α profile shape with a radius α that is larger than 7 μm and less than 20 μm. The relative difference of refractive indexes $\Delta_1$ between the core center and the cladding is between 0.3% and 1%. The extended depressed gradient core 2 has an α profile shape that is a continuation of the gradient index core 1. The radial dimension of the depressed extended core is greater than 1 μm and less than 7 μm. The depression that surrounds the extended depressed gradient core has a radial dimension between 0 and 35 μm. The relative negative difference $\Delta_2$ of refractive indexes between the depression and the cladding is less than −0.1%.

The invention claimed is:

1. A multimode optical fiber, comprising:
   a graded index core having a radius a greater than 23 μm and smaller than 33 μm, a first relative refractive index difference $\Delta_1$ between the core center and a cladding being greater than 0.9%;
   a depressed extended gradient core which is an extension of said graded index core, the depressed extended gradient core having the radial dimension b which is greater than 3 μm and smaller than 5.5 μm, a second relative refractive index difference $\Delta_2$ between the minimum of the extended gradient core and the cladding having a negative value between −0.45% and −0.1%;
   a depression surrounding said extended gradient core, the refractive index of said depression being lower than the refractive index of the cladding, and the radial dimension c of the depression being between 1 μm and 5 μm; and
   the cladding surrounding said depression.

2. The multimode optical fiber according to claim 1, wherein said graded index core has an α-profile.

3. The multimode optical fiber according to claim 1, wherein said extended gradient core has an α-profile which is a continuation of the α-profile of the graded index core.

4. The multimode optical fiber according to claim 3, wherein said radius a, said first relative refractive index difference $\Delta_1$, said radial dimension b, said second relative refractive index difference $\Delta_2$, said radial dimension c, and the parameter α of said α-profile have been selected such that the maximum differential group delay between the fastest and the slowest guided mode is smaller than 0.5 ns/km.

5. The multimode optical fiber according to claim 2, wherein said radius a, said first relative refractive index difference $\Delta_1$, said radial dimension b, said second relative refractive index difference $\Delta_2$, said radial dimension c, and the parameter α of said α-profile have been selected such that the difference between the effective indices of the neighboring modal groups is at least 0.001 at the wavelength of 1310 nm and at least 0.0007 at the wavelength of 850 nm.

6. A multimode optical fiber, comprising:
   a graded index core having a radius a greater than 15 μm and smaller than 23 μm, a first relative refractive index difference $\Delta_1$ between the core center and a cladding having a value between 0.3% and 0.9%;
   a depressed extended gradient core which is an extension of said graded index core, the depressed extended gradient core having the radial dimension b which is greater than 3 μm and smaller than 7 μm, a second relative refractive index difference $\Delta_2$ between the minimum of the extended gradient core and the cladding having a negative value between −0.5% and −0.15%;
   a depression surrounding said extended gradient core, the refractive index of said depression being lower than the refractive index of the cladding, and the radial dimension c of the depression being between 1 μm and 5 μm; and
   the cladding surrounding said depression.

7. The multimode optical fiber according to claim 6, wherein said graded index core has an α-profile.

8. The multimode optical fiber according to claim 7, wherein said extended gradient core has an α-profile which is a continuation of the α-profile of the graded index core.

9. The multimode optical fiber according to claim 7, wherein said radius a, said first relative refractive index difference $\Delta_1$, said radial dimension b, said second relative refractive index difference $\Delta_2$, said radial dimension c, and the parameter α of said α-profile have been selected such that the difference between the effective indices of the neighboring modal groups is at least 0.001 at the wavelength of 1310 nm and at least 0.0007 at the wavelength of 850 nm.

10. An optical telecommunications system comprising an optical transmitter, an optical receiver and an optical multimode optical fiber, said optical multimode optical fiber comprising:
a graded index core having a radius a greater than 22 μm and smaller than 27 μm, a first relative refractive index difference $\Delta_1$ between the core center and a cladding having a value between 0.7% and 1.5%,
a depressed extended gradient core which is an extension of said graded index core, the depressed extended gradient core having the radial dimension b which is greater than 3 μm and smaller than 6 μm, a second relative refractive index difference $\Delta_2$ between the minimum of the extended gradient core and the cladding having a negative value between −0.4% and −0.2%,
a depression surrounding said extended gradient core, the refractive index of said depression being lower than the refractive index of the cladding, and the radial dimension c of the depression being between 1 μm and 7 μm, and
the cladding surrounding said depression.

11. The optical telecommunications system according to claim 10, wherein said graded index core has an α-profile.

12. The optical telecommunications system according to claim 11, wherein said extended gradient core has an α-profile which is a continuation of the α-profile of the graded index core.

13. The optical telecommunications system according to claim 11, wherein said radius a, said first relative refractive index difference $\Delta_1$, said radial dimension b, said second relative refractive index difference $\Delta_2$, said radial dimension c, and the parameter α of said α-profile have been selected such that the bandwidth of the system is greater than 5 GHz.km, and such that a complete set or an arbitrary set of guided modes is adapted to be excited in said optical multimode optical fiber.

14. The optical telecommunications system according to claim 13, wherein said radius a, said first relative refractive index difference $\Delta_1$, said radial dimension b, said second relative refractive index difference $\Delta_2$, said radial dimension c, and the parameter α of said α-profile have been selected such that the bandwidth of the system is greater than 10 GHz.km.

15. The optical telecommunications system according to claim 13, wherein said radius a, said first relative refractive index difference $\Delta_1$, said radial dimension b, said second relative refractive index difference $\Delta_2$, said radial dimension c, and the parameter α of said α-profile have been selected such that the bandwidth of the system is greater than 20 GHz.km.

16. The optical telecommunications system according to claim 10, wherein the transmitter is a VCSEL.

17. An optical telecommunications system comprising an optical transmitter, an optical receiver and an optical multimode optical fiber, said optical multimode optical fiber comprising:
a graded index core having a radius a greater than 17 μm and smaller than 23 μm, a first relative refractive index difference $\Delta_1$ between the core center and a cladding having a value between 0.5% and 0.75%,
a depressed extended gradient core which is an extension of said graded index core, the depressed extended gradient core having the radial dimension b which is greater than 3 μm and smaller than 6 μm, a second relative refractive index difference $\Delta_2$ between the minimum of the extended gradient core and the cladding having a negative value between −0.45% and −0.2%,
a depression surrounding said extended gradient core, the refractive index of said depression being lower than the refractive index of the cladding, and the radial dimension c of the depression being between 1 μm and 7 μm, and
the cladding surrounding said depression.

18. The optical telecommunications system according to claim 17, wherein said graded index core has an α-profile.

19. The optical telecommunications system according to claim 18, wherein said extended gradient core has an α-profile which is a continuation of the α-profile of the graded index core.

20. An optical telecommunications system comprising an optical transmitter, an optical receiver and an optical multimode optical fiber, said optical multimode optical fiber comprising:
a graded index core having a radius a greater than 14 μm and smaller than 17 μm, a first relative refractive index difference $\Delta_1$ between the core center and a cladding having a value between 0.5% and 0.7%,
a depressed extended gradient core which is an extension of said graded index core, the depressed extended gradient core having the radial dimension b which is greater than 3 μm and smaller than 6 μm, a second relative refractive index difference $\Delta_2$ between the minimum of the extended gradient core and the cladding having a negative value between −0.45% and −0.2%,
a depression surrounding said extended gradient core, the refractive index of said depression being lower than the refractive index of the cladding, and the radial dimension c of the depression being between 1 μm and 7 μm, and
the cladding surrounding said depression.

21. The optical telecommunications system according to claim 20, wherein said graded index core has an α-profile.

22. The optical telecommunications system according to claim 21, wherein said extended gradient core has an α-profile which is a continuation of the α-profile of the graded index core.

* * * * *